United States Patent
Schneider et al.

(10) Patent No.: US 10,155,518 B2
(45) Date of Patent: Dec. 18, 2018

(54) METHOD AND CONTROL UNIT FOR OPERATING A DRIVETRAIN WITH AN AUTOMATED TRANSMISSION

(71) Applicant: ZF Friedrichshafen AG, Friedrichshafen (DE)

(72) Inventors: Florian Schneider, Lindenberg im Allgäu (DE); Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 267 days.

(21) Appl. No.: 15/162,874

(22) Filed: May 24, 2016

(65) Prior Publication Data

US 2016/0362109 A1 Dec. 15, 2016

(30) Foreign Application Priority Data

Jun. 11, 2015 (DE) .......................... 10 2015 210 666

(51) Int. Cl.
*B60W 30/18* (2012.01)
*B60W 10/02* (2006.01)
(Continued)

(52) U.S. Cl.
CPC ...... *B60W 30/18063* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS

| 5,275,267 A * | 1/1994 | Slicker | F16D 48/066 192/103 R |
| 5,314,050 A * | 5/1994 | Slicker | B60W 10/02 477/171 |

(Continued)

FOREIGN PATENT DOCUMENTS

| DE | 100 31 816 A1 | 4/2001 |
| DE | 102 23 464 A1 | 12/2002 |

(Continued)

OTHER PUBLICATIONS

German Search Report Corresponding to 10 2015 210 666.7 dated Apr. 5, 2016.

*Primary Examiner* — Justin Holmes
(74) *Attorney, Agent, or Firm* — Davis & Bujold PLLC; Michael J. Bujold

(57) ABSTRACT

A method of operating a drive-train with an automated transmission and a drive aggregate and the automated transmission provides at least two starting gears for the forward driving direction, and with a transmission-internal or transmission-external starting clutch. The method of operating the drive-train, during crawling at a crawling speed in the forward driving direction, such that for crawling in a starting gear engaged in the transmission for forward driving and with the starting clutch engaged without slip, the drive aggregate is operated in a rotational speed regulated manner so that a crawling speed is obtained, which depends on the rotational speed of the drive aggregate and the gear ratio of the starting gear engaged in the transmission. Based on actuation of an operating element of a speed regulating unit, at least one appropriate starting gear for crawling is determined and automatically engaged in the transmission.

10 Claims, 1 Drawing Sheet

(51) Int. Cl.
*B60W 10/11* (2012.01)
*B60W 10/06* (2006.01)

(52) U.S. Cl.
CPC ...... *B60W 10/11* (2013.01); *B60W 30/18018* (2013.01); *B60W 2510/0638* (2013.01); *B60W 2510/1005* (2013.01); *B60W 2540/16* (2013.01); *B60W 2710/021* (2013.01); *B60W 2710/023* (2013.01); *B60W 2710/025* (2013.01); *B60W 2710/0644* (2013.01); *B60W 2710/1005* (2013.01); *B60W 2720/10* (2013.01)

(56) References Cited

U.S. PATENT DOCUMENTS

| | | | | |
|---|---|---|---|---|
| 5,941,792 | A | * | 8/1999 | Amendt ................ B60W 10/02 477/74 |
| 6,113,515 | A | * | 9/2000 | Salecker ............... F16D 48/064 192/82 T |
| 7,025,708 | B2 | * | 4/2006 | Rieger .................... F16D 48/06 477/171 |

FOREIGN PATENT DOCUMENTS

| | | |
|---|---|---|
| DE | 10 2010 061 919 A1 | 5/2012 |
| DE | 10 2010 055 920 A1 | 6/2012 |
| WO | 2004/028848 A1 | 4/2004 |

\* cited by examiner

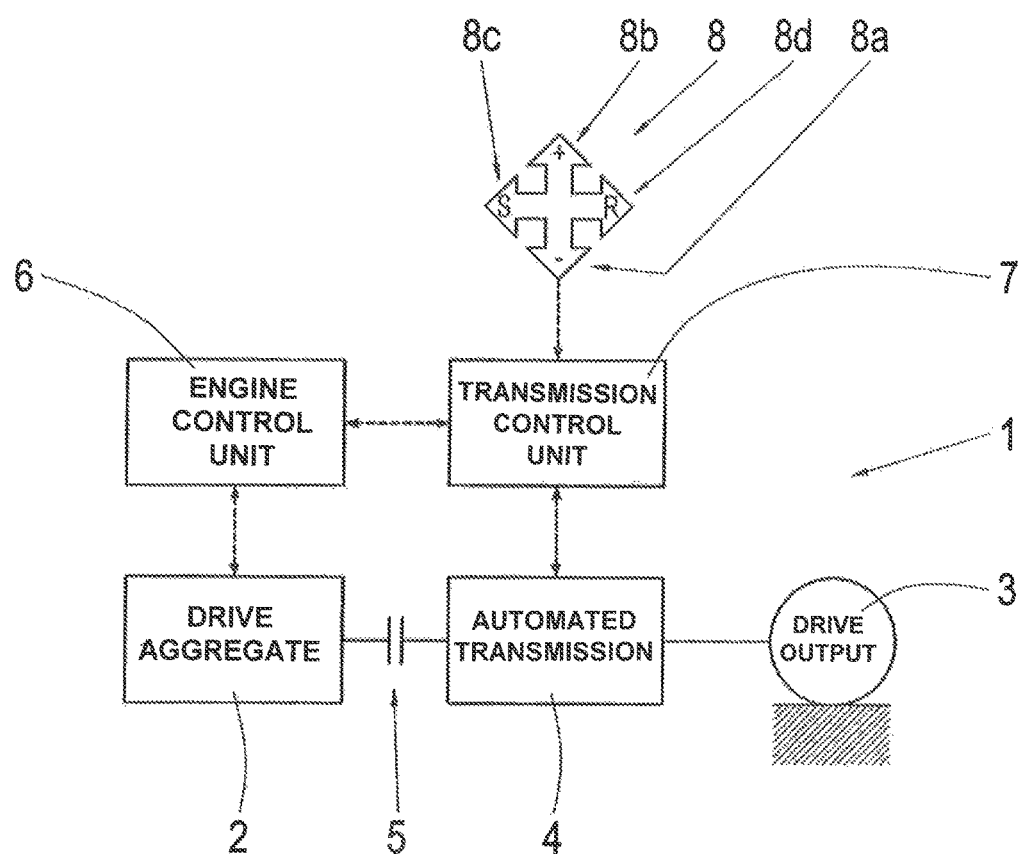

METHOD AND CONTROL UNIT FOR OPERATING A DRIVETRAIN WITH AN AUTOMATED TRANSMISSION

This application claims priority from German patent application serial no. 10 2015 210 666.7 filed Jun. 11, 2015.

FIELD OF THE INVENTION

The invention concerns a method for operating a drivetrain comprising an automated transmission. In addition, the invention concerns a control unit for implementing the method.

BACKGROUND OF THE INVENTION

From common practice drive-trains with an automated transmission and a drive aggregate are known, such that the automated transmission provides at least two starting gears for a forward driving direction. Such an automated transmission is preferably in the form of a group transmission wherein the group transmission comprises a main transmission and in addition a splitter group and/or a range group. The automated transmission comprises a plurality of shifting elements, such that depending on the gear engaged a first number of the shifting elements of the automated transmission are closed and a second number of them are open. In addition, a drive-train with an automated transmission and a drive aggregate comprises a starting clutch, which can be a transmission-internal or a transmission-external starting clutch. When starting, such a starting clutch is operated with slip in order to determine, during the starting process, the torque transmitted by the starting clutch by virtue of its slip.

From common practice it is also known that during crawling, a drive-train with an automated transmission, a drive aggregate and a starting clutch can be operated in the forward driving direction at a crawling speed. For crawling, a starting gear for the forward driving direction is engaged in the transmission and the starting clutch is closed fully so that it is not slipping. The drive aggregate is operated in a rotational speed regulated manner. This then produces a crawling speed that depends on the speed of the rotational speed regulated drive aggregate and on the gear ratio of the starting gear engaged in the transmission.

During such crawling with a rotational speed regulated drive aggregate, a closed and therefore non-slipping starting clutch and an engaged starting gear, the vehicle can be moved at a constant, relatively slow crawling speed without actuating the gas or accelerator pedal, i.e. without having to alternate between the gas pedal and the brake pedal.

Then, when with the starting gear engaged, the starting clutch closed and not slipping and the rotational speed regulated drive aggregate the crawling speed is too high, for example in a traffic jam, and the driver wishes to reduce it, the driver has until now had to actuate the brake pedal, whereupon the crawling function is automatically terminated, so that thereafter the crawling function has to be reactivated by a control system or by the driver. This is inconvenient, so that crawling with a closed, non-slipping starting clutch, an engaged starting gear and a rotational speed regulated drive aggregate has not been regarded as fully acceptable by drivers.

Consequently a method is needed for operating a drivetrain, with the help of which, while crawling with a closed, non-slipping starting clutch, an engaged starting gear and a rotational speed regulated drive aggregate, the crawling speed can be adapted by the driver without the driver having to terminate crawling by actuating the brake pedal.

DE 102 23 464 A1 concerns a method for controlling and/or regulating an automated clutch and/or an automated transmission of a motor vehicle, in which a tendency to crawl is established by a crawling strategy, such that the crawling strategy can be changed by the driver of the vehicle, namely when the driver actuates at least one key of a cruise control. A cruise control is also known as a speed regulating unit. In this prior art crawling is understood to mean a condition in which the automated clutch is operated with slip. Thus, DE 102 23 464 A1 does not relate to crawling with a closed, non-slipping starting clutch, an engaged starting gear and a drive aggregate with rotational speed regulation.

SUMMARY OF THE INVENTION

Starting from there, the purpose of the present invention is to provide a new type of method for operating a drive-train that comprises an automated transmission, and a control unit for implementing the method.

This objective is achieved by a method for operating a drive-train comprising an automated transmission as described and claimed below.

According to the invention, as a function of the actuation of an operating element of a speed regulating unit, at least one appropriate starting gear is determined for crawling and engaged automatically in the transmission.

When a drive-train is operated with a closed, non-slipping starting clutch, a starting gear for the forward driving direction engaged and a rotational speed regulated drive aggregate, the invention makes possible a particularly advantageous adaptation of the crawling speed of the drive-train by actuating an operating element of the speed regulating unit, namely in that depending on the actuation of the operating element a starting gear for the automated transmission is automatically determined and engaged, which gear is appropriate for a desired change of the crawling speed that depends on the actuation of the operating element. Accordingly, no actuation of a break pedal is necessary if the crawling speed during crawling is too high.

According to an advantageous further development, the actuation of an operating element of the speed regulating unit is interpreted as a desired relative change of the crawling speed, so that if it is desired to increase the crawling speed a higher starting gear with a lower gear ratio, and if it is desired to reduce the crawling speed a lower starting gear with a higher gear ratio, is automatically engaged in the automated transmission. In this way, as a function of the gear ratios of the starting gears of the automated transmission, the crawling speed can be automatically adapted by actuating an operating element of the speed regulating unit.

In an advantageous further development, the actuation of an operating element of the speed regulating unit is evaluated as a desired absolute nominal crawling speed and, as a function of the desired nominal crawling speed, a starting gear for the automated transmission is automatically calculated and engaged in the automated transmission, which gear provides an actual crawling speed that is as close as possible to the desired nominal crawling speed, if necessary having regard to a crawling speed limit value that has to be observed.

Furthermore, as a function of the actuation of an operating element of the speed regulating unit for the purpose of crawling, a nominal value is preferably determined for the rotational speed regulation of the drive aggregate. Preferably, that starting gear is then calculated and engaged which, with the lowest possible nominal rotational speed for the speed regulation of the drive aggregate, produces an actual crawling speed which comes as close to the desired nominal crawling speed without exceeding it, and thereafter the nominal rotational speed for the rotational speed regulation is increased in such manner that the actual crawling speed corresponds to the desired nominal crawling speed. With this further development, which also determines and adapts the nominal value for the rotational speed regulation of the drive aggregate, the crawling speed can be adapted continuously.

According to a further advantageous further development, an actuation of a Set operating element that serves to set the nominal speed and/or an actuation of a Resume operating element that serves to reactivate a previous nominal speed are evaluated, in order to influence the crawling. Preferably, when the Set operating element or the Resume operating element is actuated, a current starting process with a slipping starting clutch is terminated and changed into crawling mode, and/or when the Set operating element or the Resume operating element is actuated, a starting process when the drive-train has previously been at rest is initiated and changed to crawling mode.

The control unit for carrying out the method is described and claimed below.

BRIEF DESCRIPTION OF THE DRAWING

Preferred further developments also emerge from the description given below. Example embodiments of the invention, to which it is not limited, are explained in more detail with reference to the sole drawing, which shows a block diagram of a drive-train with an automated transmission.

DETAILED DESCRIPTION OF THE PREFERRED EMBODIMENTS

The present invention concerns a method and a control unit for operating a drive-train having an automated transmission, a drive aggregate and a starting clutch. The FIGURE shows a greatly simplified diagram of a drive-train 1, which comprises a drive aggregate 2 and an automated transmission 4 connected between the drive aggregate 2 and a drive output 3. The automated transmission can be a group transmission comprising a main transmission and a splitter group and/or a range group, such that the automated transmission provides a plurality of starting gears for a forward driving direction. In addition the drive-train 1 has a starting clutch 5, which can be in the form of a transmission-internal or a transmission-external starting clutch and which is connected between the drive aggregate 2 and shifting elements (not shown) of the automated transmission 4. Typically, such a drive-train is used in commercial vehicles. The FIGURE also shows a control unit 6 for controlling and/or regulating the operation of the drive aggregate 2, and a control unit 7 for controlling and/or regulating the operation of the automated transmission 4, so that the control unit 6 is an engine control unit and the control unit 7 is a transmission control unit. In accordance with the broken-line arrows in the FIGURE, the engine control unit 6 exchanges data with the drive aggregate 2 and the transmission control unit 7 exchanges data with then automated transmission 4. In addition, the engine control unit 6 and the transmission control unit 7 exchange data with one another.

Now, the present invention concerns only such details with the help of which a drive-train 1 comprising an automated transmission 4 can be operated particularly advantageously in a crawling mode in the forward driving direction, such that for crawling in the sense of the present invention a starting gear for the forward driving direction is engaged in the automated transmission 4 and furthermore the starting clutch 5 is fully closed so that it is not operating with slip, and in addition such that the drive aggregate 2 is operated in a rotational speed regulated manner in order to regulate the speed of the drive aggregate 2 to a nominal rotational speed, such that as a function of the rotational speed of the speed regulated drive aggregate 2 and the gear ratio of the starting gear engaged in the automated transmission 4, a crawling speed is obtained at the drive output 3.

According to the invention, as a function of actuating, for crawling, an operating element 8 of a speed regulating unit, with a fully closed and non-slipping starting clutch 5, with a gear engaged in the automated transmission 4 and with a drive aggregate 2 operated in a rotational speed regulated manner, at least one appropriate starting gear is determined and automatically engaged in the automated transmission 4. This makes it possible to change automatically the crawling speed obtained, as a function of the gear ratio of the starting gear engaged in the automated transmission 4, by changing the starting gear, in order thereby to adapt the crawling speed automatically.

Then, when for example a drive-train 1 is operating in a traffic jam with a crawling speed in the forward driving direction that is too high, such that the distance from a vehicle ahead is getting too small, by actuating for example a Minus operating element 8a of the speed regulating unit, which is interpreted as a desired relative reduction of the crawling speed, in the automated transmission 4 a lower starting gear with a higher gear ratio is automatically engaged, whereby a lower crawling speed is obtained while the nominal value for the nominal rotational speed of the rotational speed regulation of the drive aggregate 2 remains the same.

In contrast, if a Plus operating element 8b of the speed regulating unit is actuated, this is interpreted as a desired relative increase of the crawling speed and then a higher starting gear with a lower gear ratio is automatically engaged in the automated transmission 4, in order to increase the crawling speed of the drive-train automatically.

Accordingly, a desired relative change of the crawling speed can be derived by the control system from the actuation of the Plus operating element 8b and/or the Minus operating element 8a of the speed regulating unit, in order as a function thereof to determine an appropriate starting gear and engage it automatically in the automated transmission 4 so that, with a fully closed starting clutch 5 and a rotational speed regulated drive aggregate 2, the drive-train can be operated in a crawling mode.

In the variants of the invention described above the actuation of an operating element of the speed regulating unit is evaluated or interpreted as a desired relative change of the crawling speed in order, as a function thereof, to engaged a starting gear automatically in the automated transmission 4.

According to a further development of the invention, the actuation of an operating element of the speed regulating unit can be evaluated or interpreted as a desired absolute nominal crawling speed. In this case, depending on the desired nominal crawling speed a starting gear for the automated transmission 4 is calculated and engaged, which gear provides an actual crawling speed as close as possible to the desired nominal crawling speed, preferably having regard to a crawling speed limit value to be observed, for example in order to prevent the crawling speed from being either too high or alternatively too low. Depending on the nominal crawling speed and the nominal speed of the rotational speed regulated drive aggregate 2, which latter is preferably the engine idling speed of the drive aggregate 2, a transmission gear ratio is then calculated which is required in order to obtain the nominal crawling speed and then, depending on the gear ratios of the starting gears available, that starting gear is selected whose gear ratio is closest to the calculated transmission gear ratio in order to provide at the drive output 3 an actual crawling speed as close as possible to the desired crawling speed, and this, as already mentioned, if necessary taking into account a crawling speed limit value to be observed.

In the above-described embodiments of the method according to the invention, in which, as a function of the actuation of the operating element of the speed regulating unit a starting gear for the forward driving direction is automatically calculated for the automated transmission 4 and engaged therein, the crawling speed can be changed in discrete steps, namely as a function of the gear ratios of the starting gears available in the automated transmission 4.

A further development of the invention provides that as a function of the actuation, for crawling, of an operating element of the speed regulating unit, a nominal value for the rotational speed regulation of the drive aggregate 2 is also determined automatically and used automatically. For this purpose, that starting gear is first calculated which, at the lowest possible rotational speed of the drive aggregate 2, provides an actual crawling speed as close as possible to the desired nominal crawling speed, but without exceeding the latter. The lowest possible nominal rotational speed for the speed regulation of the drive aggregate 2 then preferably corresponds to the idling speed of the drive aggregate 2. Thereafter, the nominal rotational speed for the speed regulation of the drive aggregate is increased in such manner that the actual crawling speed corresponds to the desired nominal crawling speed. Thus, in this variant of the invention, that starting gear is determined in which the desired nominal crawling speed can be obtained at an engine speed as low as possible, but one that is higher than or equal to the idling speed. The nominal rotational speed for the speed regulation of the drive aggregate 2 is determined from the gear ratios and the nominal crawling speed. The nominal rotational speed for the rotational speed regulation is then raised to that value.

In this way the crawling speed can be adapted in a continuously variable manner since it is no longer governed by the available gear ratio intervals of the starting gears for the forward driving direction, but instead, the nominal rotational speed of the speed regulation of the drive aggregate 2 is used as a further influencing parameter.

As already mentioned, the appropriate starting gear and if necessary a suitable nominal rotational speed for the speed regulation are determined as a function of the actuation of an operating element of a speed regulating unit, wherein a desired relative change of the crawling speed or a desired absolute nominal crawling speed for the crawling process is preferably derived from the actuation of the Plus operating element 8b or the Minus operating element 8a of the speed regulating unit. At low crawling speeds the speed regulating unit as such is not active, so that its operating elements can be used for influencing the crawling speed in a simple and reliable manner which is easy for the driver to understand.

According to an advantageous further development, an actuation of a Set operating element 8c that serves to set the nominal speed and/or an actuation of a Resume operating element 8d of the speed regulating unit that serves to reactivate a previously applicable nominal speed, are evaluated in order to influence the crawling mode of the drive-train.

A first variant of the invention provides that when for the drive-train 1 a current starting process with a slipping starting clutch 5 is taking place, this starting process is automatically terminated if during the starting process with the slipping starting clutch 5 the Set operating element 8c or the Resume operating element 8d of the speed regulating unit is actuated. In this case the clutch 5 is fully closed, the gear engaged in the transmission 4 remains engaged and the drive aggregate 2 is operated in a speed-regulated manner, so that thereafter driving continues at a crawling speed that depends on the rotational speed of the drive aggregate 2 and the gear ratio of the starting gear in the automated transmission 4.

When the Resume operating element 8d is actuated it can also be provided that a previous crawling speed of a previously active crawling process is used as the nominal crawling speed, and then, as a function thereof, an appropriate starting gear for the automated transmission 4 and if necessary an appropriate nominal speed for the rotational speed regulated drive aggregate 2 are determined and used.

In a further variant of the invention, it is provided that when the Set operating element 8c or the Resume operating element 8d is actuated while the drive-train is at rest, a starting process is initiated, i.e. the drive-train is set into motion and accelerated by closing the starting clutch 5, and this until with a non-slipping clutch 5, i.e. a fully closed starting clutch 5, and with a rotational speed regulated drive aggregate 2 and a starting gear engaged in the automated transmission 4, driving can continue at a constant crawling speed.

In the case when the Resume operating element 8d is actuated, it can on the other hand be provided that the previously existing crawling speed is used as the nominal crawling speed, so that as a function thereof the appropriate starting gear and if necessary an appropriate nominal value for the rotational speed regulation of the drive aggregate 2 are automatically determined and used.

The invention also concerns a control unit for carrying out the method according to the invention, this control unit preferably being the transmission control unit 7. It is also possible, however, for the control unit to be the engine control unit 6. The corresponding functions can also be distributed among more than one control unit.

The corresponding control unit has means for implementing the method according to the invention, the means including hardware means and software means.

The hardware means consist of interfaces for the exchange of data with the assemblies involved in implementing the method according to the invention, namely the operating elements of the speed regulating unit, the transmission 4 and the drive aggregate 2. Other hardware means are a memory for data storage and a processor for data processing.

The software means are program modules for implementing the method according to the invention.

As a function of actuating an operating element 8 of the speed regulating unit, the control unit determines at least one appropriate starting gear for crawling, and controls the transmission 4 for the automatic engagement of the gear. If necessary, as a function of the actuation, for crawling, of an operating element 8 of the speed regulating unit, the control unit also determines, a nominal value for the rotational speed regulation of the drive aggregate 2 and emits the value.

The operating elements 8a, 8b, 8c, 8d shown in the FIGURE can be separate hardware operating elements. Alternatively, they can be designed as a single hardware operating element whose operating direction is determined by pulling or pushing forward or downward or backward or upward so as to actuate the operating elements 8a, 8b, 8c, 8d.

INDEXES

1 Drive-train
2 Drive aggregate
3 Drive output
4 Transmission
5 Starting clutch
6 Control unit
7 Control unit
8 Operating element
8a Minus operating element
8b Plus operating element
8c Set operating element
8d Resume operating element

The invention claimed is:

1. A method of operating a drive-train while crawling at an initial crawling speed in a forward driving direction, the drive train having an automated transmission and a drive aggregate, the automated transmission having at least two starting gears for the forward driving direction, and the drive-train also having either a transmission-internal or a transmission-external starting clutch, the method comprising:

initiating the method while driving in the forward driving direction at the initial crawling speed with a first starting gear being engaged in the transmission for the forward driving direction and with the starting clutch being engaged without slipping, and with the drive aggregate being operated in a rotational speed regulated manner so that the initial crawling speed is obtained, which depends on a rotational speed of the drive aggregate and on a gear ratio of the first starting gear engaged in the transmission;

actuating an operating element of a speed regulating unit;

determining, with a control unit, a second starting gear for crawling at a desired crawling speed based on the operating element of the speed regulating unit actuated;

automatically engaging the second starting gear in the transmission with the control unit;

regulating the rotational speed of the drive aggregate to obtain the desired crawling speed; and recognizing, with the control unit, the actuation of the operating element of the speed regulating unit as either a desired increase or decrease of the initial crawling speed such that, when a higher crawling speed is desired, a higher starting gear with a lower gear ratio is automatically engaged as the second starting gear in the transmission, and, when a lower crawling speed is desired, a lower starting gear with a higher gear ratio is automatically engaged as the second starting gear in the transmission.

2. The method according to claim 1, further comprising recognizing, with the control unit, the actuation of the operating element of the speed regulating unit as a desired absolute nominal crawling speed, and based on the desired absolute nominal crawling speed, the second starting gear is automatically calculated and engaged, the second starting gear providing an actual crawling speed that corresponds to the desired absolute nominal crawling speed taking into account a limit value for the actual crawling speed that must be observed.

3. The method according to claim 1, further comprising determining, with the control unit, for crawling a nominal value for the rotational speed regulation of the drive aggregate based on the operating element of the speed regulating unit which was actuated.

4. The method according to claim 3, further comprising first, calculating and engaging, with the control unit, the second starting gear which, with a nominal rotational speed for the speed regulation of the drive aggregate, provides an actual crawling speed that corresponds to a desired nominal crawling speed without exceeding the desired nominal crawling speed, and thereafter increasing the nominal rotational speed for the rotational speed regulation of the drive aggregate in such manner that the actual crawling speed corresponds to the desired nominal crawling speed.

5. The method according to claim 1, further comprising determining, with the control unit, at least one of a desired change of the initial crawling speed and a desired absolute nominal crawling speed from at least one of:

an actuation of a first operating element of the speed regulating unit that serves to increase a nominal speed; and an actuation of a second operating element of the speed regulating unit that serves to reduce the nominal speed.

6. The method according to claim 1, further comprising evaluating, with the control unit, at least one of:

an actuation of a set operating element of the speed regulating unit that serves to set a nominal speed; and an actuation of a resume operating element of the speed regulating unit that serves to reactivate a previous nominal speed in order to influence the crawling.

7. The method according to claim 6, further comprising terminating, with the control unit, a current starting process with a slipping starting clutch and a change to crawling mode takes place when either the set operating element or the resume operating element is actuated.

8. The method according to claim 6, further comprising while the drive-train is previously at rest, initiating, with the control unit, a starting process and changing the starting process to a crawling mode when either the set operating element or the resume operating element is actuated.

9. A control unit for implementing a method of operating a drive-train having an automated transmission and a drive aggregate, the automated transmission provides at least two starting gears for a forward driving direction, and also having either a transmission-internal or a transmission-external starting clutch, namely a method for operating such a drive-train during crawling at a crawling speed in the forward driving direction such that for crawling in a starting gear engaged in the transmission for the forward driving direction and with the starting clutch engaged without slipping, the drive aggregate is operated in a rotational speed regulated manner so that the crawling speed is obtained, which depends on rotational speed of the drive aggregate and on a gear ratio of the starting gear engaged in the transmission, the method comprising:

actuating an operating element of a speed regulating unit, determining, with the control unit, at least one appropriate starting gear in the transmission for crawling, when the operating element of the speed regulating unit is actuated, and controlling the transmission, with the control unit, for automatic engagement of the at least one appropriate starting gear, and, when the operating element of the speed regulating unit is actuated, the control unit determines and emits for crawling a nominal value for the rotational speed regulation of the drive aggregate.

10. A method of operating a drive-train of a vehicle while the vehicle is crawling at an initial crawling speed in a forward driving direction, the drive train having a drive aggregate and an automated transmission, and a starting clutch arranged between the drive aggregate and the automated transmission, the automated transmission having at least two starting gears that are engagable for driving the vehicle in the forward driving direction, the method comprising:

initiating the method while the vehicle is crawling at the initial crawling speed in the forward driving direction;
   determining a desired starting gear for crawling from the at least two starting gears, based on actuation of an operating element of a speed regulating unit, the operating element being actuated to adjust the crawling speed of the vehicle from the initial crawling speed to a desired crawling speed, and the crawling speed of the vehicle being dependent on a rotational speed of the drive aggregate and a gear ratio of the desired starting gear engaged in the transmission;
   automatically engaging the desired starting gear in the automated transmission and fully engaging the starting clutch; and
   operating the drive aggregate to regulate the rotational speed thereof and obtain the desired crawling speed of the vehicle.

* * * * *